(12) United States Patent
Kim et al.

(10) Patent No.: US 9,094,867 B2
(45) Date of Patent: Jul. 28, 2015

(54) METHOD AND APPARATUS FOR DETERMINING CHANNEL QUALITY IN A WIRELESS COMMUNICATION SYSTEM

(71) Applicant: Samsung Electronics Co., Ltd., Gyeonggi-do (KR)

(72) Inventors: Eun-Yong Kim, Gyeonggi-do (KR); Ho-Joong Kwon, Gyeonggi-do (KR); Joseph Jeon, Gyeonggi-do (KR); June Moon, Gyeonggi-do (KR); Young-Goo Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 117 days.

(21) Appl. No.: 14/041,499

(22) Filed: Sep. 30, 2013

(65) Prior Publication Data

US 2014/0321299 A1    Oct. 30, 2014

(30) Foreign Application Priority Data

Apr. 30, 2013    (KR) .................. 10-2013-0048143

(51) Int. Cl.
*H04W 24/00*    (2009.01)
*H04W 24/08*    (2009.01)
*H04W 72/04*    (2009.01)

(52) U.S. Cl.
CPC ............. *H04W 24/08* (2013.01); *H04W 72/04* (2013.01)

(58) Field of Classification Search
CPC ............................... H04W 72/04; H04W 24/08
USPC .......................................................... 370/352
See application file for complete search history.

(56) References Cited

U.S. PATENT DOCUMENTS

| | | | | |
|---|---|---|---|---|
| 8,593,989 B2 * | 11/2013 | Sun et al. | ...................... | 370/252 |
| 2009/0305715 A1 | 12/2009 | Barve et al. | | |
| 2010/0271968 A1 | 10/2010 | Liu et al. | | |
| 2012/0052901 A1 | 3/2012 | Zhu et al. | | |

FOREIGN PATENT DOCUMENTS

| | | | |
|---|---|---|---|
| KR | 1020120007526 | | 1/2012 |
| WO | WO2012/040935 | * | 4/2012 |
| WO | WO 2012/040935 | | 4/2012 |
| WO | WO 2012/075387 | | 6/2012 |

* cited by examiner

*Primary Examiner* — Dang Ton
*Assistant Examiner* — Mewale Ambaye
(74) *Attorney, Agent, or Firm* — The Farrell Law Firm, P.C.

(57) ABSTRACT

A method and apparatus are provided for determining channel quality in a wireless communication system. The method includes receiving Channel Quality Information (CQI) from a receiver; generating a channel quality reference value by correcting the received CQI using first resource use/nonuse information received from a scheduler that indicates whether an adjacent cell used resources at a previous time, and received signal power information measured in the adjacent cell; and determining a channel quality value at a current time using the generated channel quality reference value and second resource use/nonuse information received from the scheduler that indicates whether an adjacent cell uses resources at the current time.

18 Claims, 4 Drawing Sheets

METHOD AND APPARATUS FOR DETERMINING CHANNEL QUALITY IN A WIRELESS COMMUNICATION SYSTEM

PRIORITY

This application claims priority under 35 U.S.C. §119(a) to Korean Patent Application Ser. No. 10-2013-0048143, which was filed in the Korean Intellectual Property Office on Apr. 30, 2013, the entire disclosure of which is incorporated herein by reference.

BACKGROUND OF THE INVENTION

1. Field of the Invention

The present invention relates generally to a wireless communication system, and more particularly, to a method and apparatus for determining channel quality in a multi-cell wireless communication system.

2. Description of the Related Art

In general, a terminal, e.g., a Mobile Station (MS) or a User Equipment (UE), estimates a DownLink (DL) channel quality using a reference signal or a pilot signal, and reports information about the estimated channel quality (hereinafter referred to as "channel quality information") to a Base Station (BS), a Node B (NB), or an evolved Node B (eNB), over an UpLink (UL) channel.

The BS uses received channel quality information, as criteria for allocating resources to the terminal, and for determining a Modulation & Coding Selection (MCS) level for the resource-allocated terminal.

The channel quality is determined mainly based on the Received Signal Strength (RSS) from a serving cell and an Interference Signal Strength (ISS) from an interfering cell(s). In particular, the ISS may vary significantly depending on whether the interfering cell uses resources. In addition, the interference reflected in the channel quality measured by the terminal may differ from the interference determined depending on whether the interfering cell uses resources at the time the channel quality is reflected. Therefore, the MCS level is often determined, based on whether the interfering cell uses resources at the current time.

Conventionally, however, the terminal merely reports the channel quality to the BS periodically or aperiodically, and does not report whether the interfering cell used resources at the time the terminal measured the channel quality. In the conventional technology, the BS may not determine the exact MCS level, which decreases the capacity of the wireless communication system. For example, when the terminal measures the channel quality at the time the interfering cell uses no resources, it reports a high-channel quality value to the BS. In response, a scheduler of the BS will assign a high MCS level to the terminal that has reported the high-channel quality value. However, when the interfering cell uses resources at the time the terminal is actually allocated resources, the terminal may fail to receive a high MCS level, and vice versa.

In contrast, when the terminal measures the channel quality at the same time the interfering cell uses resources, it may report a low-channel quality value to the BS. In response, the scheduler of the BS will assign a low MCS level to the terminal. However, when the interfering cell does not use resources at the time the terminal is actually allocated resources, the terminal may still receive only the low MCS level, thereby decreasing resource efficiency.

SUMMARY OF THE INVENTION

An aspect of the present invention is to address at least the above-mentioned problems and/or disadvantages and to provide at least the advantages described below.

Accordingly, an aspect of the present invention is to provide a method for accurately determining, by a transmitter, channel quality at a current time, in consideration of whether an interfering cell used resources at a time a receiver measured the channel quality.

Another aspect of the present invention is to provide an apparatus for accurately determining channel quality at a current time, in consideration of whether an interfering cell used resources at a time a terminal measured the channel quality.

In accordance with an aspect of the present invention, a method is provided for determining channel quality, by a transmitter, in a wireless communication system. The method includes receiving Channel Quality Information (CQI) from a receiver; generating a channel quality reference value by correcting the received CQI using first resource use/nonuse information received from a scheduler that indicates whether an adjacent cell used resources at a previous time, and received signal power information measured in the adjacent cell; and determining a channel quality value at a current time using the generated channel quality reference value and second resource use/nonuse information received from the scheduler that indicates whether an adjacent cell uses resources at the current time.

In accordance with another aspect of the present invention, an apparatus is provided for determining channel quality in a wireless communication system. The apparatus includes a storage for storing first resource use/nonuse information received from a scheduler that indicates whether an adjacent cell used resources at a previous time, second resource use/nonuse information received from the scheduler that indicates whether the adjacent cell uses resources at a current time, and received signal power information received from the scheduler and measured in the adjacent cell; a channel quality reference value generator for generating a channel quality reference value by correcting Channel Quality Information (CQI) received from a receiver, based on the first resource use/nonuse information stored in the storage, and Sounding Reference Signal (SRS) received signal power information measured in the adjacent cell; and a channel quality determiner for determining channel quality at the current time using the channel quality reference value, based on the second resource use/nonuse information, and the SRS received signal power information measured in the adjacent cell.

In accordance with another aspect of the present invention, a method is provided for determining channel quality by a transmitter in a wireless communication system. The method includes receiving Channel Quality Information (CQI) from a receiver; receiving, from a scheduler, first resource use/nonuse information indicating whether an adjacent cell used resources at a previous time, second resource use/nonuse information indicating whether the adjacent cell uses resources at a current time, and received signal power information measured in the adjacent cell; and determining a channel quality value at the current time by correcting the received CQI using a ratio value of received signal power strength of an adjacent cell that used resources at the previous time to received signal power strength of an adjacent cell that uses resources at the current time, based on the first resource use/nonuse information, the second resource use/nonuse information, and the received signal power information.

In accordance with another aspect of the present invention, an apparatus is provided for determining channel quality in a wireless communication system. The apparatus includes a storage for storing first resource use/nonuse information received from a scheduler that indicates whether an adjacent cell used resources at a previous time, second resource use/nonuse information received from the scheduler that indicates whether the adjacent cell uses resources at a current time, and received signal power information measured in the adjacent cell; and a channel quality determiner for determining a channel quality value at the current time by correcting Channel Quality Information (CQI) received from a receiver, using a ratio value of received signal power strength of an adjacent cell that used resources at the previous time to received signal power strength of an adjacent cell that uses resources at the current time, based on the received the first resource use/nonuse information, the second resource use/nonuse information, and the received signal power information.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to embodiments of the present invention described herein, channel quality information reported by a terminal is corrected to match with a channel quality at a current time, for efficient DL transmission in a multi-cell wireless communication system. As a result, adaptive DL data transmission is possible based on an accurate channel quality.

Herein, a transmitter is assumed to be a BS, an NB, or an eNB, and a receiver is assumed to be a terminal, an MS, or a UE. However, the transmitter and the receiver are limited to being the BS and the terminal, respectively.

Herein, the terms "value" and "information" will be used interchangeably unless stated otherwise.

In addition, the terms "Channel Quality Information (CQI)" and "Signal to Interference plus Noise Ratio (SINR)", as used herein, are assumed to have the same meaning. For example, CQI may include a channel coefficient and/or an SINR. Generally, CQI includes an SINR. Therefore, CQI and SINR may be used interchangeably herein.

In the following description, the term "previous time" refers to a time at which a receiver (or a terminal) measured CQI, and the term "current time" refers to a time at which a transmitter (or a BS) allocates resources to the receiver (or the terminal). The current time may also refer to a time at which the BS determines an MCS level for the terminal. Basically, in the description below, a time at which a terminal measures CQI is different from a time at which the terminal is allocated resources from a BS.

According to certain embodiments of the present invention, the BS determines channel quality in consideration of whether an interfering cell was using resources at a previous time when the terminal measured the channel quality, thereby improving the DL performance.

Figure 1:
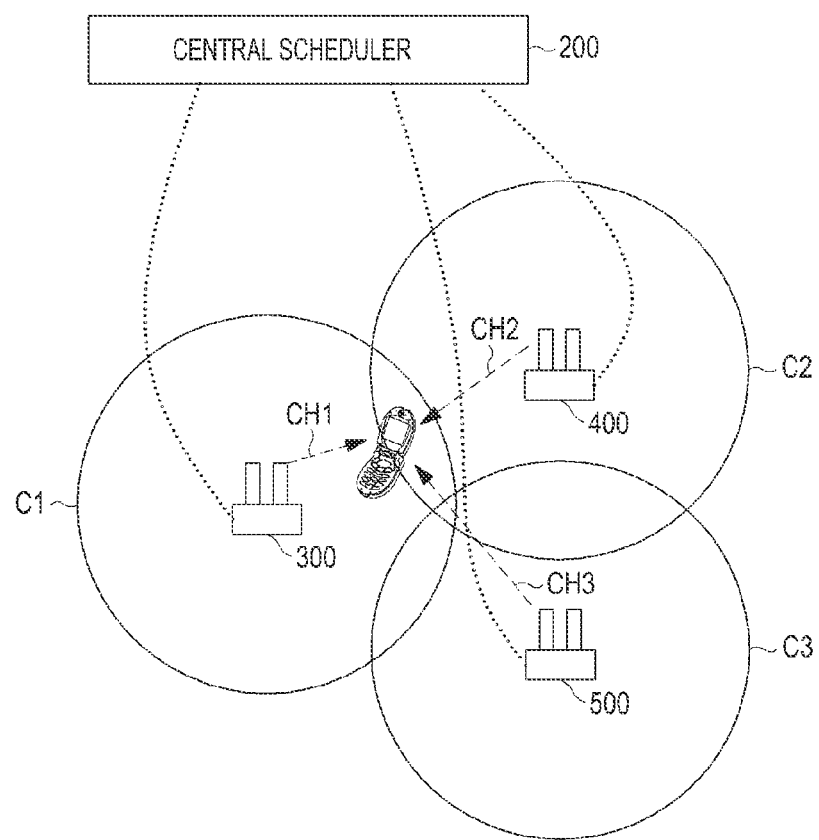
FIG. 1 illustrates a wireless communication system according to an embodiment of the present invention.

FIG. 1 illustrates a wireless communication system according to an embodiment of the present invention.

Referring to FIG. 1, the wireless communication system includes a terminal (or receiver) 100 and three BSs (or transmitters) 300, 400, and 500. Of course, the wireless communication system is not limited to including one terminal 100 and three BSs 300, 400, and 500.

BS 300 forms a serving cell C1, and BSs 400 and 500 form adjacent cells C2 and C3, respectively. Therefore, BS 300 is connected to the terminal 100 by a signal channel CH1, and in the adjacent cells C2 and C3, which function as interfering cells for the serving cell C1, BSs 400 and 500 are connected to the terminal 100 by interference channels CH2 and CH3, respectively.

The wireless communication system further includes a central scheduler (or centralized scheduler) 200. Herein, the central scheduler 200 will be referred to as a "scheduler" for short.

The scheduler 200 receives Active UE/buffer information and Sounding Reference Signal (SRS) received signal power information for all terminals, from the cells C1, C2, and C3. Based on the received Active UE/buffer information and SRS received signal power information, the scheduler 200 performs resource coordination for the cells C1, C2, and C3. As a result of the resource coordination, the scheduler 200 transmits multi-cell coordination result information and SRS received signal power information to each of the cells C1, C2, and C3. The multi-cell coordination result information includes information indicating whether each of the cells C1, C2, and C3 is allowed to use resources. Based on the multi-cell coordination result information, each cell uses only the allowed resources.

The multi-cell coordination result information for each cell is transmitted to the BSs 300, 400, and 500 of the cells C1, C2, and C3. Therefore, each of the BSs 300, 400, and 500 may determine whether adjacent cells are allowed to use resources, i.e., whether adjacent cells use resources.

The multi-cell coordination result information, which is transmitted from the scheduler 200 to a BS of each cell, may include first resource use/nonuse information indicating whether an adjacent cell used resources at the previous time, i.e., when the terminal measured the CQI, and second resource use/nonuse information indicating whether an adjacent cell uses resources at the current time, i.e., when a BS allocates resources to the terminal. Therefore, the multi-cell coordination result information may include first resource use/nonuse information indicating whether an adjacent cell used resources at the time the terminal measured the CQI, and second resource use/nonuse information indicating whether an adjacent cell uses resources at the time the BS 300 in the serving cell C1 is allocating resources to the terminal.

The BS 300 in the serving cell C1 corrects the CQI to match with the actual CQI at the current time, using the CQI received from the terminal over a UL channel and the first and second resource use/nonuse information received from the scheduler 200. Accordingly, the BS 300 may adaptively transmit DL data based on the accurate CQI.

Figure 2:
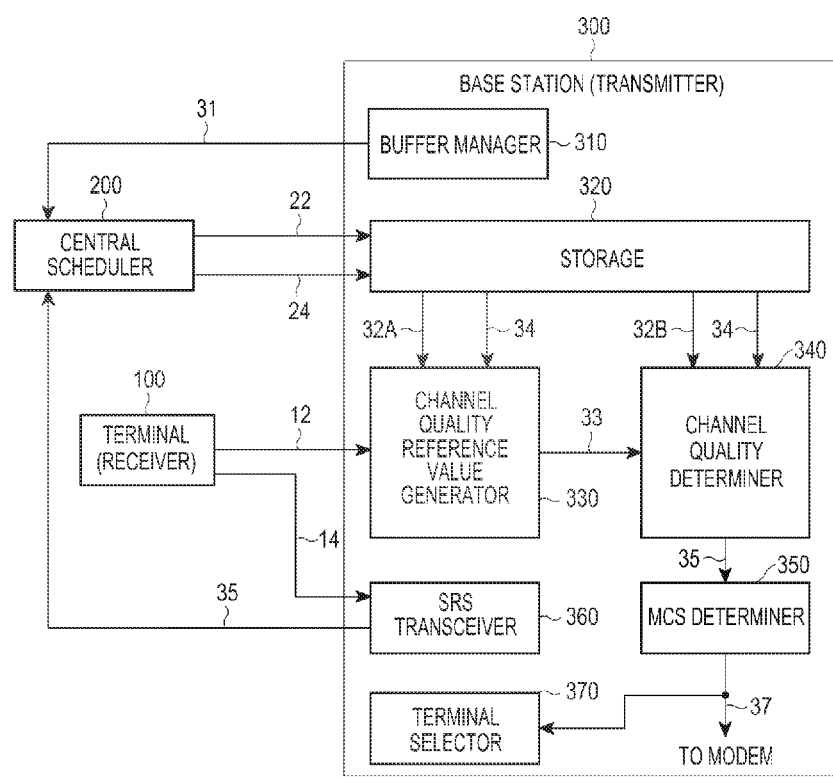
FIG. 2 illustrates a BS according to an embodiment of the present invention.

FIG. 2 illustrates a BS according to an embodiment of the present invention. In FIG. 2, the scheduler 200 and the terminal 100 are also illustrated for a better understanding.

Additionally, the internal configuration of the BS 300 in the serving cell C1 is illustrated in FIG. 2 by way of example, and each of BSs 400 and 500 in adjacent cells C2 and C3 may have the same configuration as BS 300 in the serving cell C1.

Referring to FIG. 2, the BS 300 includes a buffer manager 310, a storage 320, a channel quality reference value generator 330, a channel quality determiner 340, an MCS determiner 350, and an SRS transceiver 360.

The buffer manager 310 stores the data that the BS 300 will transmit to the terminal 100 over a DL channel, and if there is data to transmit to the terminal 100, the buffer manager 310 requests resources from the scheduler 200. The buffer manager 310 transmits, to the scheduler 200, Active UE/Buffer information 31, such as information related to the data to be transmitted to the scheduler 200, e.g., information identifying a target terminal and a size of the data to be transmitted.

The storage 320 stores multi-cell coordination result information 22 and SRS received signal power information 24 for adjacent cell terminals, which are received from the scheduler 200. The received multi-cell coordination result information 22 may include first resource use/nonuse information 32A for at least one adjacent cell at the previous time and second resource use/nonuse information 32B for at least one adjacent cell at the current time. For example, the resource use/nonuse information for an adjacent cell may be stored in the storage 320 in the form of a table after being divided on a time basis.

The channel quality reference value generator 330 generates a channel quality reference value 33 that is determined by correcting CQI 12 received from the terminal 100, based on the first resource use/nonuse information 32A and the SRS received signal power information 34, which are stored in the storage 320. The channel quality reference value 33 may refer to a channel quality value that remains unchanged under predetermined interference. That is, the channel quality reference value 33 is a value that is used to determine the correct channel quality, based on whether an adjacent cell uses resources during resource allocation. The CQI 12 reported by the terminal 100 is a value that significantly varies depending on whether an interfering cell uses resources at the time the terminal 100 measured the CQI. Therefore, it may not be preferable to set the CQI itself reported by the terminal 100 as a channel quality reference value, and the channel quality value that is determined based on whether adjacent cells C2 and C3 use resources at the time the adjacent cells C2 and C3 allocate the resources, may be a channel quality value that remains unchanged under predetermined interference.

The channel quality reference value generator 330 generates the channel quality reference value 33 by correcting the CQI 12 received from the terminal 100, based on the information indicating whether an adjacent cell uses resources and the SRS received signal power information 34, which are stored in the storage 320. That is, the channel quality reference value generator 330 corrects the CQI 12 received from the terminal 100, based on the information indicating whether an interfering cell was using resources when the terminal 100 measured the CQI, and based on the information indicating received signal power in each cell for an SRS signal for the terminal 100 of the adjacent cell.

For example, when a channel quality reference value is used that is determined by correcting the CQI in consideration of whether an adjacent cell was using resources, if an adjacent cell used no resources at the time the terminal 100 measured the CQI (i.e., if the adjacent cell was not functioning as an interfering cell), the channel quality reference value generator 330 reflects the channel quality deterioration caused by the use of resources by an adjacent cell in the corrected channel quality reference value, considering the SRS received signal power information 34 of the adjacent cell as an interference level.

The channel quality determiner 340, a unit for determining the correct channel quality at the current time, receives the channel quality reference value 33 from the channel quality reference value generator 330, and determines the correct channel quality at the current time, based on the second resource use/nonuse information 32B for an adjacent cell at the current time and the SRS received signal power information 34, which are stored in the storage 320.

For example, when an adjacent cell was using resources when the terminal 100 measured the CQI and the BS 300 receives this CQI and uses a channel quality reference value determined by correcting the received CQI, if the adjacent cell uses no resources at the current time, the channel quality determiner 340 may increase the channel quality based on the SRS received signal power information 34. However, if the adjacent cell is using resources at the current time, the channel quality determiner 340 may use the intact channel quality reference value 33 as a channel quality value at the current time.

The MCS determiner 350 receives a channel quality value at the current time from the channel quality determiner 340, determines an MCS level appropriate thereto, and transfers it to a terminal selector 370 and a modem (not shown). The terminal selector 370 determines which of the terminals in the cell will be allocated resources, using the MCS level information. The modem transmits packets to the terminal to be allocated resources, with the MCS level received from the MCS determiner 350.

The SRS transceiver 360 includes a transmitter and a receiver. The receiver receives an SRS signal 14 from the terminal 100. The BS 300 measures received signal power of the SRS signal received via the receiver. The transmitter transmits the measured received signal power of the SRS signal received via the receiver to the scheduler 200 as received signal power information 35.

A detailed description will now be made of an operation of generating a channel quality reference value in consideration of whether adjacent users used resources when a terminal measured CQI, and an operation of generating a corrected channel quality value based on the channel quality reference value and whether adjacent cells are using resources at a current time.

First, it will be assumed that the BS 300 can determine whether adjacent cells use resources from the previous time to the current time, as shown in Table 1 below. Specifically, Table 1 indicates whether adjacent cells use resources and may be provided from the scheduler 200.

TABLE 1

|  | C2 | C3 |
| --- | --- | --- |
| n − 4 | ○ | x |
| n − 3 | ○ | x |

TABLE 1-continued

|   | C2 | C3 |
|---|---|---|
| n − 2 | ○ | x |
| n − 1 | x | x |
| n | x | ○ |

In Table 1, n, n−1, n−2, n−3, and n−4 represent resource allocation times, ○ indicates that a relevant adjacent cell uses resources at a relevant time, and x indicates that a relevant adjacent cell does not use resources at a relevant time.

In the following description, the time n is a current time at which the BS 300 allocates resources to the terminal 100, and the time n−2 is a previous time at which the terminal 100 measured the CQI (or a time at which the terminal 100 reported the CQI to the BS 300).

Because the adjacent cell C2 does not use resources and the adjacent cell C3 uses resources at time n in Table 1, the interfering cell C3 becomes an interfering cell. Therefore, the target channel quality value $CQI_n$ that the BS 300 desires to determine at the current time, may be defined as shown in Equation (1).

$$CQI_n = \frac{S}{I_3 + N} \tag{1}$$

In Equation (1), S denotes received signal power strength of a serving cell, $I_2$ denotes interference received signal power strength, and N denotes thermal noise.

Unlike the target channel quality value $CQI_n$ in Equation (1), at a previous time n−2, the adjacent cell C2 becomes an interfering cell because the adjacent cell C2 uses resources and the adjacent cell C3 does not use any resources. Therefore, the channel quality value $CQI_{n-2}$ at the previous time n−2 may be defined as shown in Equation (2).

$$CQI_{n-2} = \frac{S}{I_2 + N} \tag{2}$$

In Equation (2), $I_2$ denotes interference received signal power strength of the cell C2.

As described above, the channel quality reference value is a channel quality value that remains unchanged under predetermined interference. In order to generate this channel quality reference value, the channel quality reference value generator 330 considers received signal power strength of the adjacent cell in which resources were used at the previous time n−2. Accordingly, the channel quality reference value generator 330 generates a channel quality reference value $CQI_{n-2}'$, as defined in Equation (3) below, by computing the channel quality value and a first parameter including the received signal power strength of the adjacent cell in which resources were used at the previous time n−2.

$$CQI_{n-2}' = \frac{S}{I_2 + N} \cdot \frac{I_2 + N}{I_2 + I_3 + N} = \frac{S}{I_2 + I_3 + N} \tag{3}$$

In Equation (3), $$\frac{I_2 + N}{I_2 + I_3 + N}$$

is a first parameter which is multiplied by the channel quality value $CQI_{n-2}$ received from the terminal 100 to generate the channel quality reference value $CQI_{n-2}'$, and may be defined as a ratio value of received signal power strength $I_2$ of an adjacent cell in which resources were used at the previous time n−2, to a sum $I_2+I_3$ of received signal power strengths of all adjacent cells.

When determining the channel quality value $CQI_n$ at a current time, the target channel quality value is calculated by multiplying the channel quality reference value $CQI_{n-2}'$ calculated in accordance with Equation (3) by a second parameter for determining the correct channel quality value at the current time, as shown in Equation (4) below.

$$CQI_n = \frac{S}{I_2 + I_3 + N} \cdot \frac{I_2 + I_3 + N}{I_3 + N} \tag{4}$$

In Equation (4), $$\frac{I_2 + I_3 + N}{I_3 + N}$$

is a second parameter that is multiplied by a channel quality reference value to generate the correct target channel quality value in Equation (1), and may be defined as a ratio value of a sum $I_2+I_3$ of received signal power strengths of all adjacent cells to a ratio value of received signal power strength $I_3$ of an adjacent cell, in which resources are used at the current time n. The target channel quality value (for example, the correct channel quality at a current time n), finally defined in Equation (1), may be determined by multiplying the channel quality reference value $CQI_{n-2}'$ by the second parameter.

Figure 3:
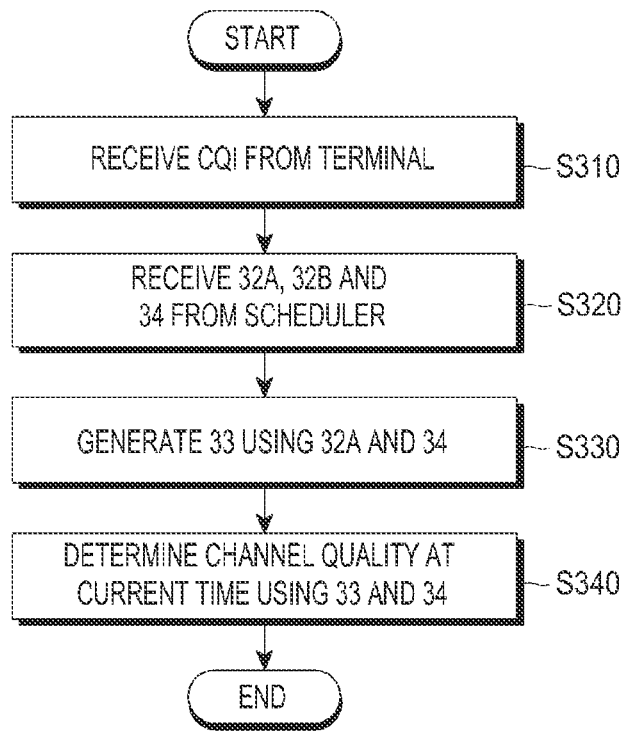
FIG. 3 is a flowchart illustrating a process of determining channel quality in a BS according to an embodiment of the present invention.

FIG. 3 is a flowchart illustrating a process of determining the channel quality in a BS according to an embodiment of the present invention.

Referring to FIG. 3, in step S310, the BS receives CQI from a terminal. Specifically, the terminal receives a DL reference signal from the BS, measures DL channel quality based on the received DL reference signal, and reports the DL CQI for the serving cell over a UL channel. Alternatively, the terminal may transmit an SRS signal to an SRS receiver in the BS of each cell, and the BS of each cell may measure received signal power of the SRS signal received via the SRS receiver, and transfer it to the scheduler as received signal power information.

In step S320, the BS receives, from the scheduler, first resource use/nonuse information 32A indicating where an adjacent cell used resources at the previous time, second resource use/nonuse information 32B indicating whether an adjacent cell uses resources at the current time, and SRS received signal power information 34.

In step S330, the BS generates a channel quality reference value 33 using a first parameter in Equation (3), which is determined based on the first resource use/nonuse information 32A, and the CQI 12 received from the terminal.

In step S340, the BS calculates the correct channel quality value at the current time using a second parameter in Equation (4), which is determined in consideration of the second resource use/nonuse information 32B, and the channel quality reference value 33.

Although not illustrated in FIG. 3, if the exact channel quality value at the current time is calculated, the BS determines an MCS level appropriate to the calculated channel quality value and transfers it to the terminal selector 370 and the modem. Based on the MCS level information, the terminal selector 370 determines to which of multiple terminals in the cell it will allocate resources to. The modem transmits packets to the terminal determined to be allocated resources, with the MCS level received from the MCS determiner 350.

Figure 4:
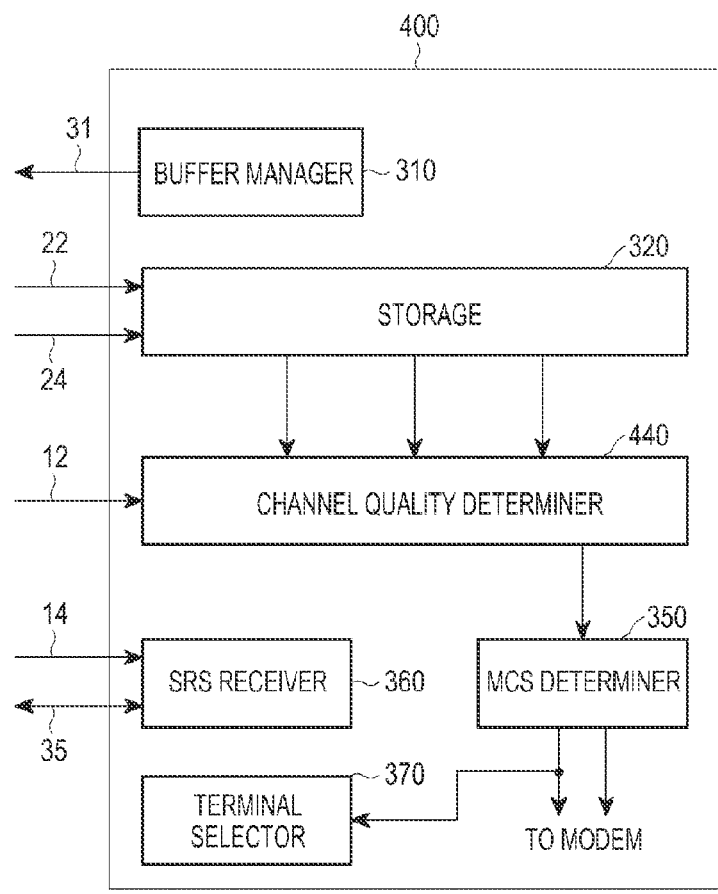
FIG. 4 illustrates a BS according to an embodiment of the present invention.

FIG. 4 illustrates a BS according to an embodiment of the present invention.

Referring to FIG. 4, a BS 400 in FIG. 4 is the same as the BS 300 illustrated in FIG. 2 in operations and functions, except that the channel quality reference value generator 330 and the channel quality determiner 340 are configured in a single component block.

In FIG. 4, a channel quality determiner 440 in the BS 400 generates a channel quality reference value in consideration of whether an adjacent cell used resources at a previous time, i.e., when the terminal measured the CQI, and generates a channel quality value in consideration of whether an adjacent cell is using resources at the current time. That is, the channel quality determiner 440, unlike the channel quality determiner 340 in FIG. 2, generates a channel quality value that is determined by correcting the channel quality information received from the terminal, based on all of the first resource use/nonuse information indicating whether an adjacent cell used resources at the previous time, second resource use/nonuse information indicating whether an adjacent cell uses resources at the current time, and SRS received signal power information.

Based on Table 1, which indicates whether adjacent cells use resources at different times, the channel quality determiner 440 receives the channel quality information $CQI_n$ of Equation (1) from the terminal, and calculates the correct channel quality value at the current time by computing a third parameter as shown in Equation (5) below.

$$CQI_n = \frac{S}{I_2+N} \cdot \frac{I_2+N}{I_3+N} = \frac{S}{I_3+N} \qquad (5)$$

In Equation (5), $$\frac{I_2+N}{I_3+N}$$

denotes the third parameter which is multiplied by the CQI received from the terminal to determine the correct channel quality value at the current time, and may be defined as a ratio of received signal power strength $I_2$ of an adjacent cell that used resources at the previous time n−2, to received signal power strength $I_3$ of an adjacent cell that uses resources at the current time n.

As such, using the BS 400 in FIG. 4, the correct channel quality value at the current time n may be determined without the process of Equation (3), by multiplying the CQI by the third parameter that is defined as a ratio of received signal power strength $I_2$ of an adjacent cell that used resources at the previous time n−2, to received signal power strength $I_3$ of an adjacent cell that uses resources at the current time n.

As is apparent from the foregoing description, according to the above-described embodiments of the present invention, the channel quality at a current time may be more accurately by taking into account whether an interfering cell used resources at when the receiver measured the channel quality in the wireless communication system.

The correct MCS level may be determined by accurately determining the channel quality at the current time.

The capacity of the wireless communication system may be improved by determining the correct MCS level.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for determining channel quality by a transmitter in a wireless communication system, the method comprising: receiving Channel Quality Information (CQI) from a receiver; generating a channel quality reference value by correcting the received CQI using first resource use/nonuse information received from a scheduler that indicates whether an adjacent cell used resources at a previous time, and received signal power information measured in the adjacent cell; and determining a channel quality value at a current time using the generated channel quality reference value and second resource use/nonuse information received from the scheduler that indicates whether the adjacent cell uses resources at the current time.

2. The method of claim 1, wherein the previous time corresponds to a time at which the receiver measured the CQI, and wherein the current time corresponds to a time at which the receiver is allocated resources.

3. The method of claim 2, wherein the channel quality reference value is calculated using the CQI measured at the previous time and received signal power strength of the adjacent cell, in which the resources were used at the previous time.

4. The method of claim 2, wherein the channel quality reference value is calculated using the CQI measured at the previous time, and a ratio value of a sum of received signal power strengths of all adjacent cells to received signal power strength of the adjacent cell, in which resources were used at the previous time.

5. The method of claim 1, wherein the channel quality value at the current time is determined using the channel quality reference value and a ratio value of a sum of received signal power strengths of the adjacent cell in which resources are used at the current value, to received signal power strengths of all adjacent cells.

6. The method of claim 1, wherein the first resource use/nonuse information and the second resource use/nonuse information are included in multi-cell coordination result information received from the scheduler.

7. An apparatus for determining channel quality in a wireless communication system, the apparatus comprising: a storage for storing first resource use/nonuse information received from a scheduler that indicates whether an adjacent cell used resources at a previous time, second resource use/nonuse information received from the scheduler that indicates whether the adjacent cell uses resources at a current time, and received signal power information received from the scheduler and measured in the adjacent cell; a channel quality reference value generator for generating a channel quality reference value by correcting Channel Quality Information (CQI) received from a receiver, based on the first resource use/nonuse information stored in the storage, and Sounding Reference Signal (SRS) received signal power information measured in the adjacent cell; and a channel quality determiner for determining channel quality at the current time using the channel quality reference value, based on the second resource use/nonuse information, and the SRS received signal power information measured in the adjacent cell.

8. The apparatus of claim 7, wherein the previous time corresponds to a time at which the receiver measured the CQI, and wherein the current time corresponds to a time at which the receiver is allocated resources.

9. The apparatus of claim 8, wherein the channel quality reference value is calculated using the CQI measured at the previous time and received signal power strength of the adjacent cell, in which resources were used at the previous time.

10. The apparatus of claim 8, wherein the channel quality reference value is calculated using the CQI measured at the previous time, and a ratio value of a sum of received signal power strengths of all adjacent cells to received signal power strength of the adjacent cell, in which resources were used at the previous time.

11. The apparatus of claim 8, wherein the channel quality value at the current time is calculated using the channel quality reference value and a ratio value of a sum of received signal power strengths of the adjacent cell in which resources are used at the current value, to received signal power strengths of all adjacent cells.

12. The apparatus of claim 7, wherein the first resource use/nonuse information, and the second resource use/nonuse information are included in multi-cell coordination result information received from the scheduler.

13. A method for determining channel quality by a transmitter in a wireless communication system, the method comprising: receiving Channel Quality Information (CQI) from a receiver; receiving, from a scheduler, first resource use/nonuse information indicating whether an adjacent cell used resources at a previous time, second resource use/nonuse information indicating whether the adjacent cell uses resources at a current time, and received signal power information measured in the adjacent cell; and determining a channel quality value at the current time by correcting the received CQI using a ratio value of received signal power strength of the adjacent cell that used resources at the previous time to received signal power strength of the adjacent cell that uses resources at the current time, based on the first resource use/nonuse information, the second resource use/nonuse information, and the received signal power information.

14. The method of claim 13, wherein the previous time corresponds to a time at which the receiver measured the CQI; and wherein the current time corresponds to a time at which the receiver is allocated resources.

15. The method of claim 13, wherein the first resource use/nonuse information and the second resource use/nonuse information are included in multi-cell coordination result information received from the scheduler.

16. An apparatus for determining channel quality in a wireless communication system, the apparatus comprising: a storage for storing first resource use/nonuse information received from a scheduler that indicates whether an adjacent cell used resources at a previous time, second resource use/nonuse information received from the scheduler that indicates whether the adjacent cell uses resources at a current time, and received signal power information measured in the adjacent cell; and a channel quality determiner for determining a channel quality value at the current time by correcting Channel Quality Information (CQI) received from a receiver, using a ratio value of received signal power strength of the adjacent cell that used resources at the previous time to received signal power strength of the adjacent cell that uses resources at the current time, based on the received the first resource use/nonuse information, the second resource use/nonuse information, and the received signal power information.

17. The apparatus of claim 16, wherein the previous time corresponds to a time at which the receiver measured the CQI, and wherein the current time corresponds to a time at which the receiver is allocated resources.

18. The apparatus of claim 16, wherein the first resource use/nonuse information and the second resource use/nonuse information are included in multi-cell coordination result information received from the scheduler.

* * * * *